May 20, 1952  H. P. WOOD  2,597,422
PROCESS OF FORMING DISPERSIONS
Filed Sept. 11, 1948  2 SHEETS—SHEET 2

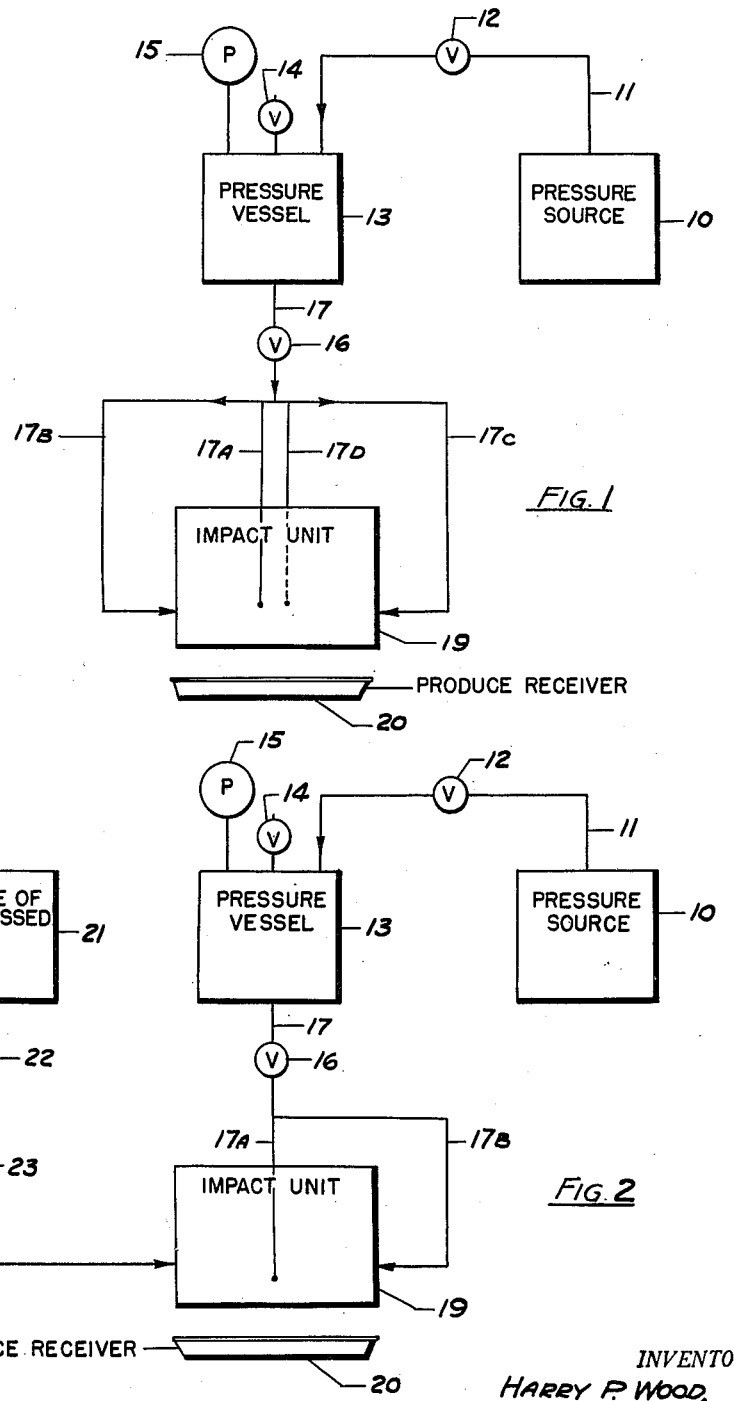

INVENTOR.
HARRY P. WOOD
BY *Alfred R. Johnson*
*Attorney*

Patented May 20, 1952

2,597,422

UNITED STATES PATENT OFFICE 2,597,422

PROCESS OF FORMING DISPERSIONS

Harry P. Wood, Westwood, Mass., assignor to Arthur D. Little, Inc., Cambridge, Mass., a corporation of Massachusetts Application September 11, 1948, Serial No. 48,910

8 Claims. (Cl. 260—37)

This invention relates to means and process for producing dispersions and more particularly for producing dispersions of particles in a fluid by opposing fluid streams.

In the past, various methods of forming dispersions have been employed. It is customary in the paint art, for instance, to employ techniques, such as ball milling and roller milling to effect dispersion of the pigments and fillers throughout the vehicle, but these methods are relatively slow and require heavy equipment. Opposed streams of fluids at 180° have been used to facilitate dispersions of fluids as have centrifugal devices of various designs. While the 180° opposed streams of fluid and the centrifugal dispersing devices function effectively for some purposes, they have been found unsuitable for my requirements wherein a more complete dispersion carried out to a finer degree of sub-division is required.

To carry out this invention a plurality of opposed fluid streams in excess of two are impelled at high velocities toward each other at an angle of less than 90° and more than 45° with respect to the axis of a cone defined by the streams. The resulting impact creates violent turbulent action and consequent dispersion.

If two nozzles are opposed at 180°, the effect directly after meeting is to create a more or less streamlined sheet of fluid at right angles to the issuing jets of fluid. While some dispersion is obtained, insufficient stream turbulence is produced with this system to cause a desirable high degree of dispersion. If a plurality of streams opposed at 180° are employed, considerable difficulty is experienced in causing the streams to meet exactly since, in order to do so, each stream must possess precisely the same kinetic energy. Two streams opposed at less than 180° but greater than 90° also tend to give streamlined flow, and are not satisfactory.

It has been found that substantially uniform turbulence may be secured with reasonable ease by the use of simple apparatus hereinafter described when more than two streams of fluid impelled at high velocities are caused to impinge one upon the other simultaneously, the streams being directed toward each other at an angle varying from 45° to less than 90° from the axis of the cone defined by the jets of fluid. The preferred angle range is from 60° to 80°.

While the velocity of streams of fluid is important, there does not appear to be any critical speed above that at which turbulence takes place. That is, the velocity must be sufficient to cause a substantial degree of turbulence after the impact of the streams. It has been observed, however, that the greater the velocity, the better the dispersion.

Smooth functioning of the process requires that the kinetic energies of the various fluid streams be about equal at their contact face. As contemplated by the process of this invention, the streams are intended to meet at a point about equally distant from the orifices, although a variation from this condition will be explained below.

After the jets of fluids have met to create substantially uniform and violent turbulence, the resulting dispersion is led off in a constant stream to a suitable container.

In order to understand this invention more clearly, reference may be had to the accompanying drawings, wherein Fig. 1 is a schematic drawing illustrating one means for carrying out the process of this invention:

Fig. 2 is a schematic drawing illustrating an alternative means for carrying out the process of this invention:

Figure 3:
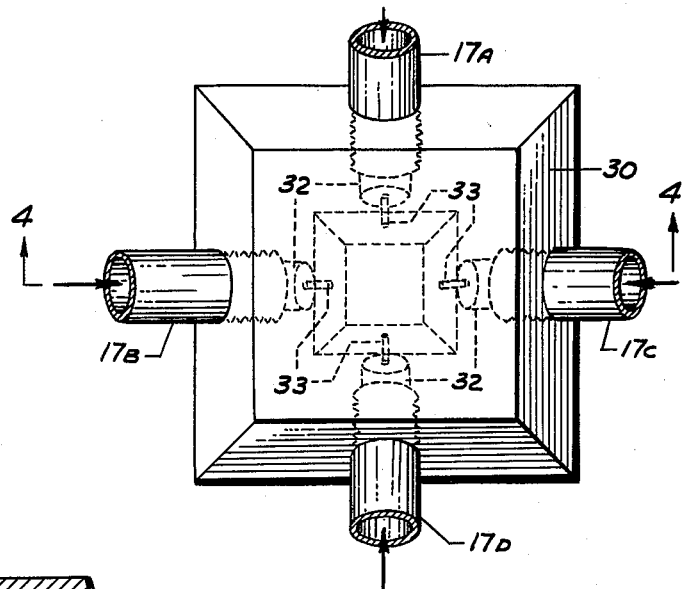
Fig. 3 is a plan view of one form of impact head.

In the system as illustrated by Fig. 1, pressure from source 10 (which may be stored gas under pressure) is communicated through line 11 controlled by valve 12 to a pressure vessel 13 containing the fluid suspension to be dispersed. The pressure vessel 13 is equipped with a safety valve 14 and pressure gauge 15. Upon opening valve 16, the fluid suspension from pressure vessel 13 is forced through line 17 (controlled by valve 16) and thence through as many branch lines 17a, 17b, 17c, etc. as necessary to lead to each nozzle in impact unit 19. The resulting dispersion is then collected in product receiver 20.

An alternative method of operating the process of this invention is to employ a constant flow high pressure liquid pump to force a liquid suspension through the nozzles in the impact head 19. If such a method is employed, the pump takes the place of the pressure source 10 and pressure vessel 13 as shown in Fig. 1, and Fig. 2. Thus, with the use of a fluid pump the suspension is introduced just above valve 16 in line 17.

A preferred method of operating the process is to introduce a gas under pressure as one or more of the opposed streams of fluid herein above described. This process may be carried out in the system shown in Fig. 2. Here the pressure in pressure source 10 is released in line 11 by opening valve 12 thus placing under pressure the fluid in pressure vessel 13. The pressure vessel is preferably equipped with safety valve 14 and pressure gauge 15. From the pressure vessel 13 the fluid containing the material to be dispersed is forced under pressure through line 17 and branch lines 17a, 17b, by opening valve 16 and is thus led into the impact unit 19. The fluid is met by a stream of gas under pressure from source 21 flowing through line 23, controlled by valve 22.

The fluid may therefore be either a liquid or a gas and contain either solid or liquid particles which are to be dispersed. As stated above, it is preferred that impact take place against at least one stream of gas, because by this means, a more thorough dispersion has been found to take place.

Figure 4:
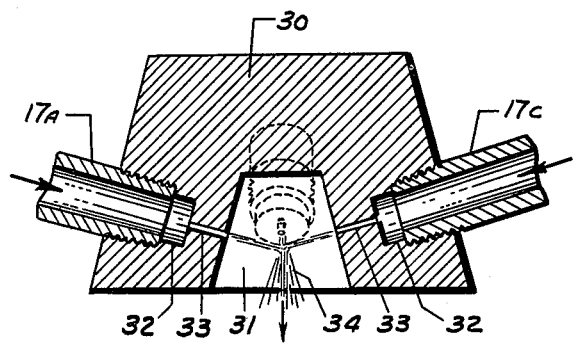
Fig. 4 is a cross-sectional view of the impact head of Fig. 3 taken on line 4—4.

One form of a relatively simple impact unit 19 is shown in Figs. 3 and 4. This unit comprises a block 30 defining a chamber 31 which has been formed in the center and lower part of the block 30. Four internally threaded passageways 32 extending part way into the block 30 and at right angles to the four sides of the chamber 31 and centrally located therein are provided to receive the correspondingly threaded ends of branch lines 17a, 17b, 17c, 17d. These ends are screwed tightly into passageways 32. Nozzles 33 axially located and continuations of passageways 32 extend to chamber 31 of block 30. The four nozzles 33 are located as two pairs diametrically opposite each other and spaced 90° apart; they are set at an angle of 75° from the axis of the cone formed by a continuation of the nozzles to a locus 34.

Figure 5:
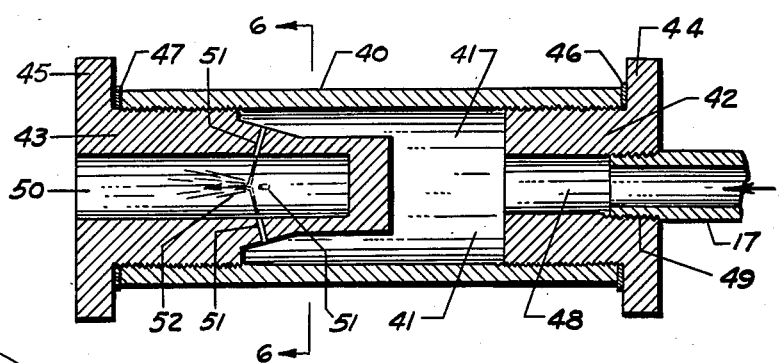
Fig. 5 is a cross-sectional view of another form of impact head.
Figure 6:
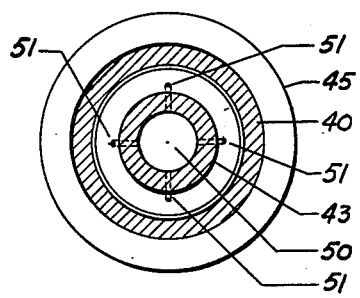
Fig. 6 is a cross-sectional view of the impact head of Fig. 5 taken on line 6—6.

Another form of a simple impact unit 19 is shown in Figs. 5 and 6. This unit comprises a cylindrical shell 40 defining a chamber 41 and is threaded internally at each end to receive correspondingly threaded plugs 42 and 43 having shoulders 44 and 45. These plugs are secured tightly into shell 40 so that the shoulders will confine gaskets 46 and 47 against shell 40 to provide fluid tight seals. End plug 42 is provided with communicating passageway 48 axially located in the plug. The passageway 48 is internally threaded at 49 to receive line 17 which is correspondingly threaded to fit tightly into the passageway. Plug 43 extends into chamber 41 in a tapered construction. A chamber 50 axially located in plug 43 is provided with four communicating passageways 51 to chamber 41 which serve as nozzles. The angle of the nozzles is 75° from the axis of the cone described by rotating said nozzles about the center line of shell 40.

During operation of the process impact unit 19 as disclosed in Figs. 3 and 4 functions as follows: Fluid is admitted to passageways 32 under pressure through each of the branch lines 17a, 17b, 17c, and 17d and as it passes through nozzles 33 attains a high velocity. All the fluid converges at a locus 34 where violent turbulence takes place and dispersion is achieved. It may be readily appreciated that one or more of the nozzles may be supplied with a gas. In Figs. 5 and 6 a device designed to utilize only one fluid is shown. Fluid to be dispersed enters chamber 41 through line 17 and passageway 48 under pressure and is forced a high velocity through nozzles 51 into chamber 50 where the streams formed by the nozzles meet at the locus 52. The dispersion is then run out of chamber 50.

The pressure source described above is stated to be a compressed gas. This may ge furnished by cylinders of compressed gas, for example, or by any other suitable means such as an air pump or other gas pumps.

While the materials used in the construction of the apparatus may be selected as desired, it is advisable to use very hard metal for the nozzles through which the fluid passes. This may be, for fluids which are not corrosive, a metal such as nitrited steel. Other materials, such as nickel-chromium and cobalt-tungsten alloys may also be used for the nozzles.

A typical example of the operation of this process may be illustrated in its application to dispersing a paint mixture composed of carbon black particles in an alkyd resin vehicle (modified glycerol-phthalic anhydride) and naphtha diluent, as follows:

An apparatus is set up in accordance with this invention, containing four nozzles each of which has an orifice .0625" in diameter. The nozzles are spaced equidistant around a center point so that streams from pairs of diametrically opposed nozzles meet at an angle of 140°, that is, at an angle of 70° with the axis of a cone formed by the jets of fluid issuing from the nozzles. Each of the nozzles is supplied with a paint mixture of the foregoing materials in the proportion of 3 per cent carbon black, 50% modified glycerin-phthalic anhydride alkyd resin, and 47% naphtha. Sufficient pressure is applied to the streams of the paint mixture to cause them to emerge at rates varying from 100 to 400 feet per second.

Examinations of the resulting dispersions and of a commercial carbon black dispersion paint by microscopic means show that one pass through the apparatus as described above is sufficient to give an equivalent dispersion and division of the carbon agglomerates.

Experiments similar to those above have been run in which one, two, and three of the four nozzles were supplied with gas under pressure. In all cases it was found that even more complete and finer dispersion resulted. It was further found to be advantageous to set the gas nozzles quite close to the point of impact, that is, from ⅛" to ¼", so as not to dissipate the kinetic energy of the gas stream through expansion.

If desired, the dispersion may be re-run through the process in order to further subdivide and distribute the dispersable material. Experimental results have shown, however, that more than two runs are seldom necessary and that no appreciable improvement occurs when increasing the number of runs beyond four.

The uses to which this process may be put are manifold. As stated above, it is well adapted to dispersing paint pigments; it may also be employed similarly in emulsification processes, and for reducing the size of solid particles suspended in a gas stream such as an air stream.

I claim:

1. The process for producing dispersions by breaking up agglomerated solid particles in fluid streams which comprises directing at a point at least three fluid streams each containing agglomerated solid particles to be dispersed, said streams being the only streams employed and all of said streams defining the perimeter of a cone and being directed at an angle with the axis of said cone of more than 45° and less than 90°, said fluid streams having substantially equal kinetic energies at the area of principal contact and impelling said fluid streams at high velocities to create sufficiently violent turbulence to break up said agglomerated solid particles into finer particles.

2. The process for producing dispersions according to claim 1 wherein the angle is between 60° and 80°.

3. The process for producing dispersions by breaking up agglomerated solid particles in a fluid stream which comprises directing at a point a liquid stream containing agglomerated solid particles to be dispersed, directing two other fluid streams at the same point, all said liquid streams and said two other fluid streams being the only streams employed and all of said streams defining the perimeter of a cone and being directed at an angle with the axis of said cone of more than 45° and less than 90°, said liquid stream and said other fluid streams having substantially equal kinetic energies at the area of principal contact and impelling said fluid streams and said liquid stream at a high velocity to create sufficiently violent turbulence to break up said agglomerated solid particles.

4. The process for producing dispersions according to claim 3 wherein the angle is between 60° and 80°.

5. The process for producing dispersions by breaking up agglomerated solid particles in a fluid stream which comprises directing at a point at least one liquid stream containing agglomerated solid particles to be dispersed, directing a stream of gas at said point, and directing at least one more fluid stream at said point, said mentioned streams being the only streams employed and all said streams defining the perimeter of a cone and being directed at an angle with the axis of said cone of more than 45° and less than 90°, said liquid, gas, and fluid streams having substantially equal kinetic energies at the area of principal contact and impelling said liquid, gas, and fluid streams at a high velocity to create sufficiently violent turbulence to break up said agglomerated solid particles into finer particles.

6. The process for producing paint dispersions from agglomerated pigment particles in a liquid vehicle which comprises directing at a point at least three streams of a mixture of pigment and liquid vehicle, said streams being the only streams employed and all said streams defining the perimeter of a cone and being directed at an angle with the axis of said cone of more than 45° and less than 90°, said streams having substantially equal kinetic energies at the area of principal contact and having a velocity of at least 100 feet per second.

7. The process according to claim 6 wherein the angle is between 60 and 80°.

8. The process according to claim 6 wherein there are four streams.

HARRY P. WOOD.

REFERENCES CITED

The following references are of record in the file of this patent:

UNITED STATES PATENTS

| Number | Name | Date |
|---|---|---|
| 756,155 | Bryant | Mar. 29, 1904 |
| 1,716,755 | Bastian | June 11, 1929 |
| 1,896,202 | Richardson | Feb. 7, 1933 |
| 2,136,024 | Schneider | Nov. 8, 1938 |
| 2,235,258 | Jones | Mar. 18, 1941 |
| 2,364,717 | Huss | Dec. 12, 1944 |
| 2,460,546 | Stephanoff | Feb. 1, 1949 |